United States Patent

Murakami et al.

[15] 3,703,227
[45] Nov. 21, 1972

[54] ELECTROMAGNETIC CLUTCH

[72] Inventors: Tadao Murakami, Katsuta; Ken Kikuchi; Riyouzou Tomozaki, both of Hitachi; Yasushi Ohuchi, Ibaraki-ken, all of Japan

[73] Assignee: Hitachi, Ltd., Tokyo, Japan

[22] Filed: Jan. 27, 1971

[21] Appl. No.: 110,032

[30] Foreign Application Priority Data

Jan. 30, 1970 Japan ..................... 45/8230

[52] U.S. Cl. .......................... 192/84 C, 192/110 R
[51] Int. Cl. ..................... F16d 27/06, F16d 27/10
[58] Field of Search .................. 192/84 C, 110 R

[56] References Cited

UNITED STATES PATENTS

| | | | |
|---|---|---|---|
| 2,919,777 | 1/1960 | Walter | 192/84 C |
| 3,455,421 | 7/1969 | Miller | 192/84 C |
| 3,530,416 | 9/1970 | Klinkenberg | 192/84 C X |

*Primary Examiner*—Allan D. Herrmann
*Attorney*—Craig & Antonelli

[57] ABSTRACT

An electromagnetic clutch comprising a rotor having a belt-receiving groove for receiving the driving force from a prime mover, a magnetic circuit and a conductive plate; a stator having electromagnetic means disposed therein; and a clutch disc mounted on a rotary shaft of a rotary machine or the like; wherein said rotor is connected to the stator through a ball bearing, and said rotor and said stator in the assembled state have a through-hole formed therein for receiving the rotary shaft and further the armature plate of said clutch disc and said conductive plate are axially arranged with a slight gap therebetween, said rotor and said stator respectively being made up of a plurality of constituent elements including pressed elements and short pipes which are united together at their contacting surfaces by friction welding.

5 Claims, 11 Drawing Figures

PATENTED NOV 21 1972 3,703,227

INVENTORS
TADAO MURAKAMI, KEN KIKUCHI,
RIYOUZOU TOMOZAKI AND YASUSHI OHUCHI

BY Craig, Antonelli, Stewart & Hill
ATTORNEYS

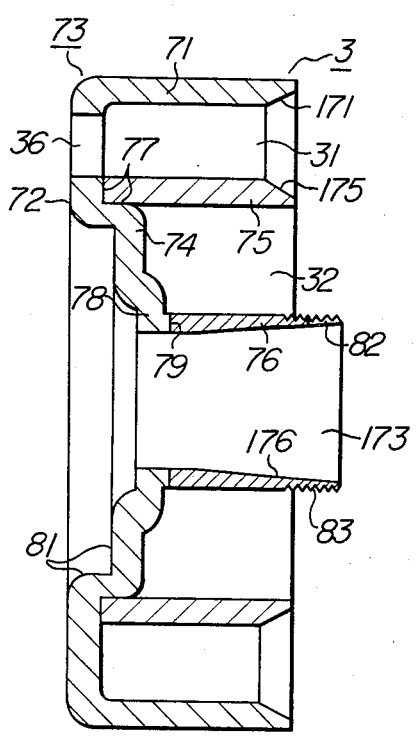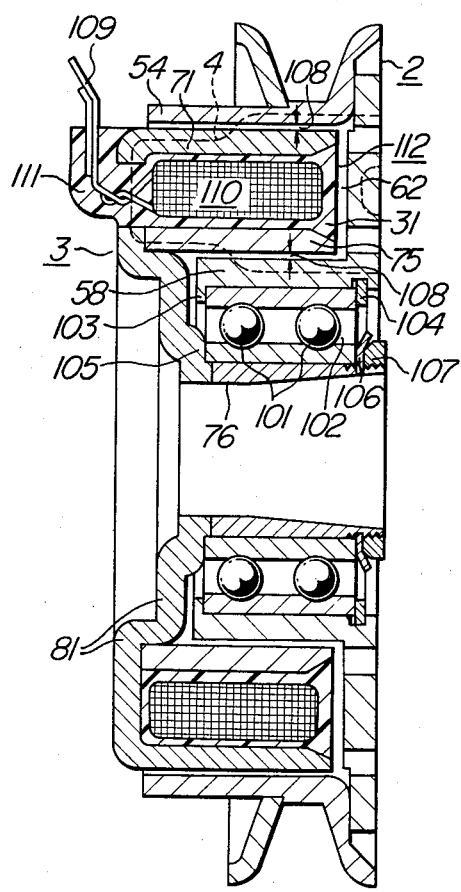

ELECTROMAGNETIC CLUTCH

BACKGROUND OF THE INVENTION

1. Field of the Invention

This invention relates to an electromagnetic clutch in which a rotary disc made of a magnetic material and another rotary disc to be driven by said first rotary disc are engaged with each other under electromagnetic force thereby to transmit a driving force to a rotary machine to be driven, and which is used, for instance, for transmitting the driving force of a car engine to the compressor of a car cooler.

2. Description of the Prior Art

In this type of device, especially a rotor has been produced by machining a cast blank material. This will be understood from the rotor unit shown in FIG. 1, etc. of U.S. Pat. No. 3,082,933 (wherein the rotor unit is called a pulley).

In order to work a rotor such that a pulley rim to define a V-groove and an axially extending flange integral with said pulley rim will appear in the same cross section, one has to resort only to press work or machining. However, since the pulley shown in said FIG. 1 has the V-groove defined by a pair of pulley rims and a projection formed at a portion opposite to said groove and projecting in the same direction and additionally said pulley is cylindrical, said pulley can not be formed by press work. Therefore, this pulley must have been produced by machining.

As is well known, machining is poor in working efficiency and hence not adapted for mass production, as compared with press work, and has been one of the factors which increased the cost of this type of device. Moreover, the pulley produced by machining has been extremely heavier than the one produced by press work.

A pulley of the type described which was produced by press work which is high in working efficiency, is shown in U.S. Pat No. 2,986,251. The pulley shown in this prior patent comprises a pair of interfitting stamped metal parts 56 and 58 having outer annular V portions 56a and 58a cooperating to form a groove for a conventional V belt 59. Parts 56 and 58 are held together by rivets 60 which serve also to clamp outer race 54b of bearing 54 between inner annular portion 56b and 58b. However, in this type of pulley the use of screws or rivets lowers the working efficiency and is not advantageous from the stand-point of mass production. In addition, this type of pulley is disadvantageous in the formation of a magnetic circuit which is most influential in the performance of the pulley, and a sufficient electromagnetic force cannot be obtained.

SUMMARY OF THE INVENTION

The primary object of the present invention is to provide an ideal electromagnetic clutch which is highly productive, light in weight, small in size and inexpensive, and yet is highly efficient in performance.

According to the present invention, there is provided an electromagnetic clutch comprising a rotor having a pulley along its periphery and a magnetic disc on one end face thereof, a stator fixed on a housing of a driven element and having electromagnetic means disposed therein, and a clutch disc arranged with a slight gap between it and the magnetic disc of the rotor, wherein said rotor is rotatably mounted on the stator through a ball bearing and at least one of the rotor and the stator is formed of a combination of constituent elements such as a pressed element and a pipe which are united together by friction welding.

Other objects, features and advantages of the invention will become apparent from the following description on an embodiment of the invention illustrated in the accompanying drawings.

BRIEF DESCRIPTION OF THE DRAWINGS

FIG. 9 is a cross-sectional view of the stator;

FIG. 10 is a cross-sectional view of the rotor and the stator, as assembled, of the electromagnetic clutch according to the invention.

DESCRIPTION OF THE PREFERRED EMBODIMENT

The present invention will be described in detail with reference to the accompanying drawings.

Figure 1:
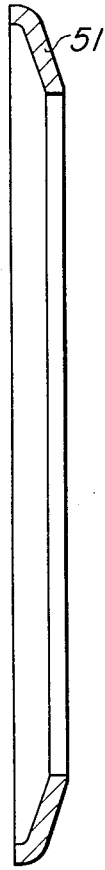
FIGS. 1, 2 and 3 are cross-sectional views of the constituent elements of a rotor according to the invention respectively.
Figure 2:
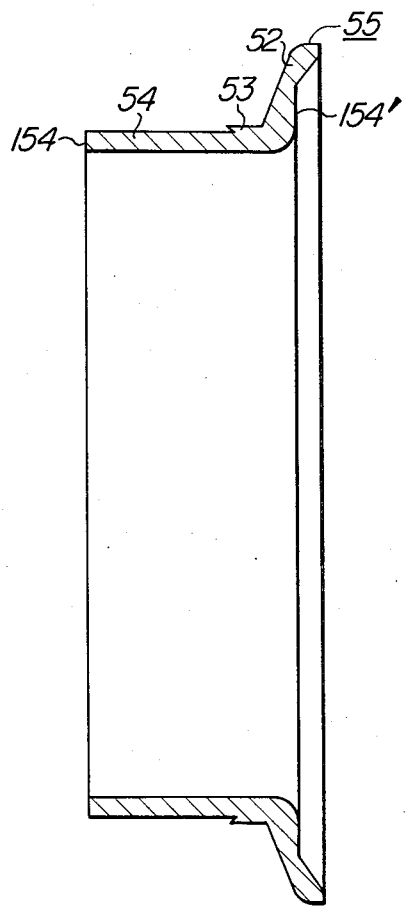
Figure 3:
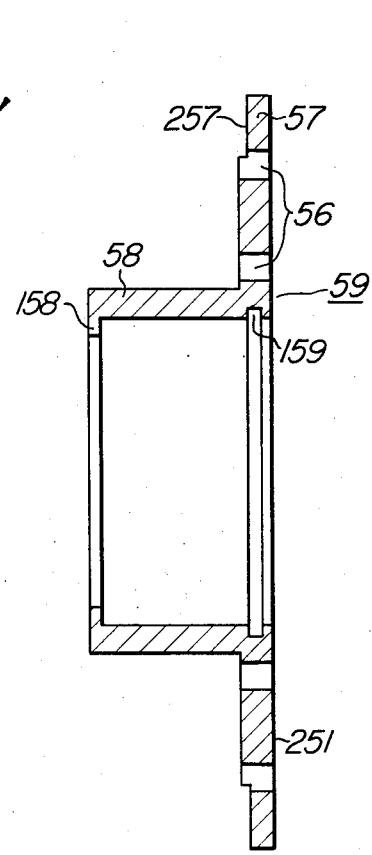

FIGS. 1, 2 and 3 are cross-sectional views of the constitutional elements of the rotor of the electromagnetic clutch according to the invention respectively.

Figure 4:
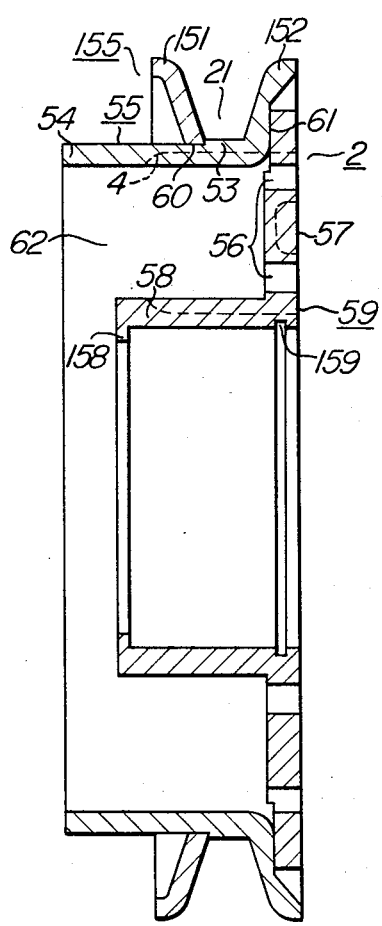
FIG. 4 is a cross-sectional view of the rotor.

Reference numerals 51, 55, 59 designate pressed elements which are all made of a magnetic material and united together as shown in FIG. 4, to form the rotor 2.

Describing more specifically, the annular pressed element 51 is formed so as to be fitted over the outer peripheral surface of the cylindrical portion 54 of the pressed element 55.

The cylindrical portion 54 has a flange 52 integrally formed at one end thereof and a step 53 formed on the outer peripheral surface thereof at a location slightly forwardly of said flange 52. Thus, it will be understood that the pressed element 51 fitted over the cylindrical portion 54 is not allowed to move beyond the step 53.

The pressed elements 51 and 55 are assembled such that the confronting faces of said pressed element 51 and the flange 52 of said pressed element 55 extend upwardly outwardly, so that pulley rims 151, 152 are formed as shown in FIG. 4 which define a V-groove 21 for receiving a belt. Further, the pressed element 51, and the flange 52 and cylindrical portion 54 of the pressed element 55 together form a pulley 155.

Figure 5:
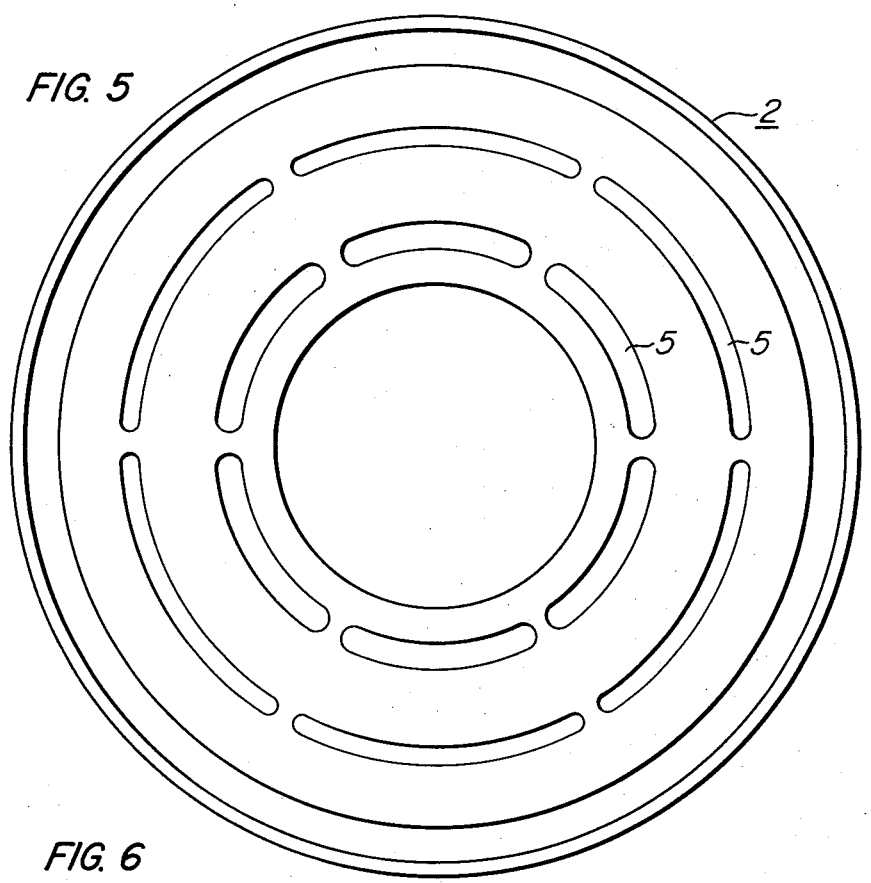
FIG. 5 is a side elevational view of the rotor plate.

The pressed element 59 has an axially extending sleeve 58 and a flange 57 extending radially vertically from an end of said sleeve 58. The flange 57, as shown in FIG. 5, is formed therein with a plurality of arcuate slots 5 arranged on two concentric circumferences, which are useful for the formation of a satisfactory magnetic circuit as will be described later.

The sleeve 58 is formed with an annular projection 158 at the end opposite to the flange 57, for retaining a ball bearing to be described later. The face of the flange 57 opposite to the sleeve 58 provides a clutch surface 257 which is opposed by an armature plate of a clutch disc to be described later. The pressed element 59 is assembled with the pressed element 55 in such a manner that the sleeve 58 of the former extends into the cylindrical portion 54 of the latter in concentrical relation and the edge portion 257 (as shown in FIG. 3) of the face of the former on the same side as the sleeve 58 abuts against the end face 154 or 154' (as shown in FIG. 2) of the cylindrical portion 54 of the latter.

The pressed elements 51, 55, 59 assembled in the manner described above are united together by friction welding, at contacting portions to form the rotor 2.

Reference numeral 159 in FIG. 3 designates a groove for receiving a locking ring which supports the ball bearing to be described later. This groove is formed by machining subsequent to the press work of the pressed element 59 or assembly of the rotor 2, since it cannot be formed by press work.

Figure 6:
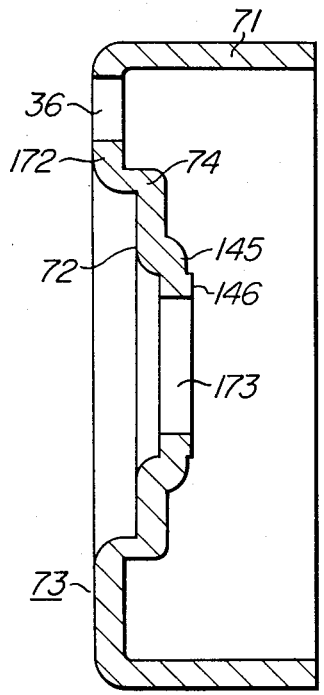
FIGS. 6, 7 and 8 are cross-sectional views of the constituent elements of a stator according to the invention respectively.
Figure 7:
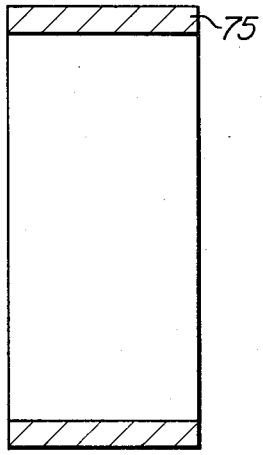
Figure 8:
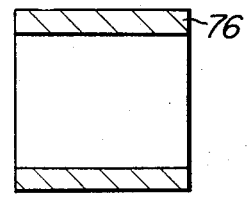

FIGS. 6, 7 and 8 are cross-sectional views of the constituent elements of the stator of the electromagnetic clutch according to the invention respectively. Reference numeral 73 designates a pressed element and 75, 76 designate rings respectively which are each obtained by cutting a pipe into a suitable length. The pressed element 73 is substantially in a U-shape and has a flange 71 and a bottom 72 formed integrally with said flange. The bottom 72 has its central portion raised stepply in the same direction as the flange 71 and a hole 173 is formed at the central portion of said raised portion for penetrating the hub of the clutch disc. In cross-section, the bottom 72 of the pressed element 73 has a first flat portion 172 extending vertically inwardly from one end of the flange 71, a stepped second flat portion 74 extending vertically inwardly from the inner edge of said first flat portion 172 and a further stepped third flat portion 145 extending vertically inwardly from the inner edge of said second flat portion 74. The inner edge of the third flat portion 145 is formed with an annular projection 146 which defines the hole 173. The ring 75 has an inner diameter equal to or slightly larger than the outer diameter of the second flat portion 74, so that it may be tightly fitted over the outer periphery of said flat portion 74. The ring 76 has an inner diameter substantially equal to the diameter of the hole 173 and is adapted to rest on the projection 146.

These elements are assembled in the state shown in FIG. 9 and united together at the contacting portions 77, 79 by friction welding, to form the stator 3.

These elements are partially machined as at 171, 175, 176 into desired shapes respectively, in consideration of the overall assembly of the electromagnetic clutch. Reference numeral 82 designates a slot for securing a washer to hold the bearing, and 83 designates the threaded portion of a nut to secure the washer. One of the stepped surfaces on the back side of the bottom 72 of the substantially U-shaped stator will be brought into mating engagement with the housing of the driven element and secured thereto as by screws.

The rotor and the stator respectively assembled in the manner described above are assembled together as shown in FIG. 10, after installing necessary elements and making necessary works.

Namely, the bearing 102 having balls 101 is press fitted into the sleeve 58 of the rotor 2 and fixedly secured therein by the projection 158 or the bearing supporting portion 103 and the locking ring 104. Thereafter, the bearing 102 is removably fitted over the ring 76 located centrally of the stator 3 and tightly fixed thereon by means of a lock nut 107 through the second step 145 or the bearing supporting portion 105 of the bottom 72 of the stator 3 and a flanged washer 106. Thus, the rotor of the invention is secured to the stator through the ball bearing.

In the space 31 formed by the flange 71 and the ring 75 of the stator 3 is disposed electromagnetic means 110 having a lead wire 109 and buried with a resin 111, to form an electromagnetic unit 112. This electromagnetic unit 112 is fitted in the manner described into the space 62 formed between the cylindrical portions 54, 58 of the rotor 2. In this case, the electromagnetic unit 112 is spaced from the cylindrical portions 54, 58 by gaps 108.

Figure 11:
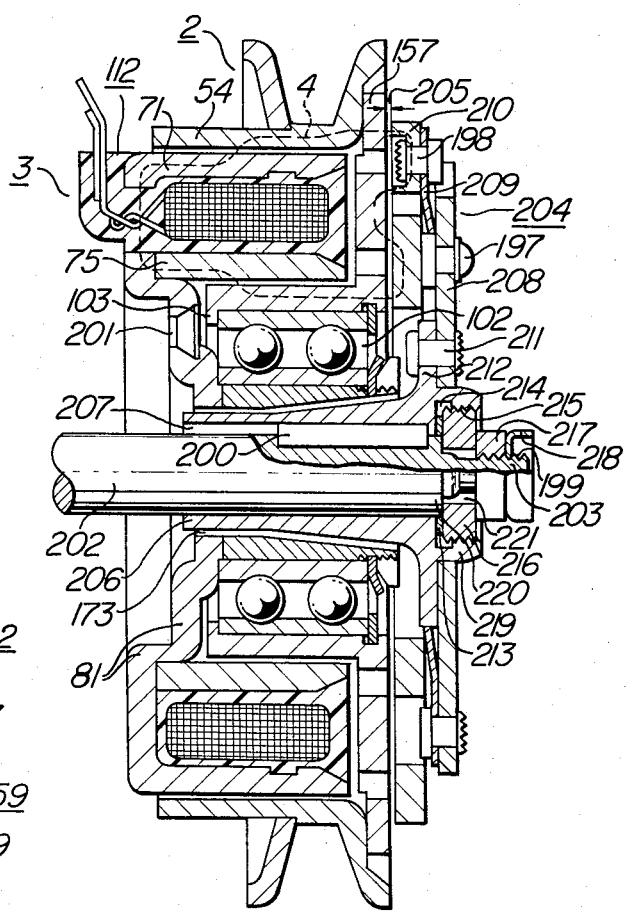
FIG. 11 is a cross-sectional view of the electromagnetic clutch mounted on the housing of a driven element.

FIG. 11 shows the electromagnetic clutch of the invention mounted on a rotary machine desired to be driven.

The electromagnetic clutch is positioned relative to the driven element (not shown) by an engaging portion 81 provided on the stator 3, and secured to the housing of said driven element by means of a screw 201. Since the stator 3 is connected with the rotor 2 through the bearing 102, the positions of said stator and said rotor are determined by relation between the housing of the driven machine and the engaging portion 81.

A rotary shaft 202 extending from the rotating machine has at its end extremity a small diameter projection 203 with threads 199 formed thereon, which extends through the through-hole 173 formed centrally of the rotor 2 and the stator 3. The rotary shaft has a clutch disc 204 mounted thereon which is opposed by a clutch surface 257 of the rotor plate 157 with a gap 105 therebetween, which rotor plate 157 was referred to as the flange 57 in the preceding description.

The hub 206 of the clutch disc 204 has a key way 207 formed in the inner surface thereof, and in FIG. 11 the hub 206 is secured to the rotary shaft 202 by a key 200 which is engaged in said key way 207.

The clutch disc 204 comprises the hub 206, an armature plate 210, a plate 208 and a leaf spring 209.

The plate 208 is fixed as by a rivet 211 to the flange 212 of the hub 206 secured to the rotary shaft 202. The armature plate 210 is supported on the plate 208 through the leaf spring 209. The leaf spring 209 has its opposite ends secured to the plate 208 and the armature plate 210 by rivets 197, 198 respectively. Further, the armature plate 210 is opposed by the rotor plate 157 with the gap 205 therebetween as stated above.

A head 219 of a hub 212 is provided with a recess 214 for receiving a spacer 213 to adjust the gap 205 and on the inner surface of said recess 214 are provided threads 215 for engagement with a threaded positioning nut 216.

Since the projection 203 of the driven shaft 202 is provided with threads 199 as stated above, the mounting or demounting of the clutch disc 204 and adjustment of the gap 205 are effected in the following manner:

First of all, the key 200 is fitted into the driven shaft 202 and then the key way 207 formed in the hub 206 is placed opposite to said key 200 to secure said driven shaft 202 and said hub 206 with each other in the rotating direction.

Thereafter, the spacer 213 is placed in the recess 214 in the hub head 219 and the externally threaded positioning nut 216 is screw-threaded into the recess 214 until it engages the spacer 213. By this step, the half of the axial displacement of the clutch disc 204 can be prevented. Then, the positioning nut 216 is pressed against and secured to a shoulder 220 formed on the driven shaft 202, whereby the axial displacement of the clutch disc can be completely prevented. In the embodiment shown, an arrangement is made such that the clutch disc 204 supported on the positioning nut 216 is secured to the driven shaft by screw-threading a nut 217 on the threaded portion 199 of the projection 203 of said driven shaft which extends outwardly through the central hole 221 of said positioning nut 216. Further, the nut 217 is tightened by a cap nut 218 which prevents said nut 217 from loosening. Thus, it will be understood that the gap 205 can be adjusted by increasing the number of spacers 213 or by changing the thickness of the spacer 213, upon removing these nuts.

The electromagnetic force of the electromagnetic means 112 mounted on the stator 3 is transmitted to the armature plate 210 through the magnetic circuit 4 indicated by the dotted line, which extends from the flange 71 of said stator 3 through the flange 54 of the rotor 2, the rotor plate 157, the armature plate 210 of the clutch disc 204, the rotor plate 157, the armature plate 210 of the clutch disc 204, the rotor plate 157 and the flange 58 of the rotor 2 to the flange 75 of the stator 3. As a result, an attraction is created between the rotor plate 157 and the armature plate 210 movably supported by the spring 209, and said armature plate 210 is attracted towards said rotor plate 157. The rotor 2 is rotated from the rotating machine (not shown) through the belt. Therefore, the armature plate 210 attracted by the rotor 2 and the clutch disc 204 associated therewith are also rotated. Thus, the driving force of the rotating machine is transmitted to a driven machine (not shown) through the clutch disc 204 and the driven shaft 202.

As described herein, the rotor and the stator of the electromagnetic clutch according to the instant invention are made up of a combination of pressed elements or pipes united together by friction welding. Therefore, as compared with conventional rotors and stators, the constituent elements of which are formed by complicated machining and/or press work and united together by screws or the like, the rotor and stator of the invention are substantially high in productivity per unit time and consequently the electromagnetic clutch can be obtained at a low cost.

Furthermore, according to the invention the length of the magnetic circuit of the rotor can be selected freely by changing the length of the flange, which in turn makes it possible to adjust the electromagnetic force according to the load and to obtain a highly flexible apparatus.

It is also to be noted that according to the invention the rotor plate can be brought into mating engagement with either end face of the flange of the rotor, though not illustrated in the drawings, according to the purpose and capacity of the electromagnetic clutch.

In addition, the rotor, the stator and the clutch disc shown in the embodiment of the invention can be rearranged by making a slight modification thereto, whereby the transmitting direction of the driving force can be changed as desired.

We claim:

1. An electromagnetic clutch comprising a pulley having a cylindrical member made of a magnetic material and provided with a first rim at one end thereof, and a second rim adapted to be fitted over said cylindrical member to define a belt receiving groove in cooperation with said first rim; a flange member made of a magnetic material and secured to at least one end of said cylindrical member to provide a clutch surface; a sleeve extending from said flange member into said cylindrical member and being rotatable together with said pulley; a stator including electromagnetic means disposed between the cylindrical member of said pulley and said sleeve, and forming part of a magnetic circuit for the magnetic vlux produced by said electromagnetic means per se, said electromagnetic means being excited from a predetermined power source; a bearing engaging said stator and rotatably supporting said sleeve; a shaft extending through said stator; and a clutch disc provided on a hub secured to said shaft and having at least the surface thereof which is opposed by said clutch surface with a predetermined gap therebetween made of a magnetic material.

2. An electromagnetic clutch according to claim 1, wherein the cylindrical member of said pulley has a step formed at a portion thereof for blocking the second rim and the second rim is secured to said step by friction welding.

3. An electromagnetic clutch according to claim 1, wherein the cylindrical member of said pulley has a predetermined length and substantially encloses said stator thereby to minimize the magnetic circuit resistance.

4. An electromagnetic clutch according to claim 1, wherein said stator has a substantially U-shaped cross section and includes an outer member having a hole of predetermined diameter formed in the central portion of the bottom thereof, a first ring disposed in the inside of said outer member and secured to the bottom thereof, and a second ring secured to said outer member in the vicinity of said hole and having an outer diameter smaller than the inner diameter of said first ring, and said electromagnetic means is inserted in the space defined by the inner wall of said outer member and the outer wall of said first ring.

5. An electromagnetic clutch according to claim 1, wherein said hub has a head having a hole whose inner diameter is sufficiently larger than the diameter of a shaft and internal threads formed in said head, and is supported on said shaft by a positioning nut in engagement with said internal threads and secured to said shaft by a tightening nut screw-threaded on a threaded portion of said shaft extending outwardly through a hole formed centrally of said positioning nut and a nut to prevent loosening of said tightening nut, the position of said positioning nut being suitably selected, whereby the gap between said clutch surface and the surface of the clutch disc made of the magnetic material and opposed by said clutch surface is controlled.

* * * * *